United States Patent [19]

Unde

[11] Patent Number: 5,024,371
[45] Date of Patent: Jun. 18, 1991

[54] WELDING PROCESS

[76] Inventor: Madhav A. Unde, P.O. Box 254474, Sacramento, Calif. 95865

[21] Appl. No.: 456,934

[22] Filed: Dec. 26, 1989

[51] Int. Cl.$^5$ .............................................. B23K 37/04
[52] U.S. Cl. ...................................... 228/216; 228/46; 228/50
[58] Field of Search .................... 228/46, 222, 50, 216

[56] References Cited

U.S. PATENT DOCUMENTS

| | | | |
|---|---|---|---|
| 2,280,150 | 4/1942 | Hasse et al. | 228/222 |
| 2,357,170 | 8/1944 | Burggraf | 228/50 X |
| 4,360,141 | 11/1982 | Kensrue | 228/46 |

OTHER PUBLICATIONS

Nanjumdeswaran *Welding and Metal Fabrication*, Sep. 1982, p. 331.

*Primary Examiner*—Kenneth J. Ramsey

[57] ABSTRACT

A process is described in which a weld in Aluminum alloy is produced without cracks and porosity; or, cracks and porosity is reduced to a low acceptable level. Thus, the process eliminates or reduces the need of non-destructive testing and re-work which usually involves gouging the defective area and re-welding to make the same sound and crack free. Porosity in the weld, however, can't be reduced once generated during solidification of the weld; therefore, cooling gradients are applied to the weld by placing a back-up material with sufficient heat-sink capacity and having thermal conductivity higher than the base metal/s, the back-up material having the same width which contacts the projected weld width on the opposite side of weld.

2 Claims, 4 Drawing Sheets

FIG. 3

TABLE

Readings of Hardness 3/16 inch from weld on Rockwell 'E' Scale.

| Back-up as Trough as in Fig 1 | Back-up of Copper as in Fig 2 |
|:---:|:---:|
| 47 | 140 |
| 37 | 131 |
| 41.5 | 132 |
| 46 | 128 |

Hardness of Aluminum alloy 6061 in T-6 condition: 87 - 90, Rockwell 'E'.

WELDING PROCESS

BACKGROUND OF THE INVENTION

My invention relates to welding procedures and particularly to production of welded joints in Aluminum alloys. It eliminates the generation of cracks and also the porosity; or, reduction of cracks and porosity, the common defects, in solidified weld, to a low level.

It is known that welds in Aluminum alloy may have internal macro and also micro cracks and voids. Some cracks may appear clearly on the surface of the weld. Minute cracks which may not appear to the naked eye, may also be discovered by dye penetrant testing. All such cracks are formed because of known reasons like contraction stresses which come into effect as metal cools down, pressures due to gases during solidification, residual stresses. When the micro-structure of the weld has numerous orientations of the crystal growths, because of several directions of cooling gradients, the interdendritic material having a range of freezing temperatures brings about shrinkage stresses, as well as macro and micro voids. It is known that last mass of atoms which solidifies may contain different different alloying elements and impurity elements. This phenomena along with paucity of available molten metal may result in macro and micro voids; and even zigzag lines of demarcation may be observed under microscope. These zigzag lines of demarcation are result of advancing fronts of the freezing molten metal in the weld joint.

Gas entrapped during solidification in the semi-solid state of the weld metal, forms familiar porosity experienced in Aluminum alloy weld micro-structure. Industry has therefore framed standards of acceptance and rejection of gas porosity in Aluminum alloy welds.

The demarcations which may be seen can be, in fact, weak joint in the solidified weld metal. Along with voids and weak joints in the solidified weld metal, stresses which come into existence, form internal micro or macro cracks. Some such cracks may appear on the surface of the weld. And porosity which comes into existence may reduce the strength of the weld joint.

Most specifications of welds do not permit any surface cracks in any classification of welds. Moreover, welds in Aluminum alloy in the manufacture of aircraft and space ship construction and such other applications ought to be without any internal defects, also. There is therefore a need of a controllable process to eliminate or reduce the porosity and cracks to acceptable level in Aluminum alloy welds.

Even though the process is described for Aluminum welds for thin sections, it may be used for welds in thicker sections and also for welds of other similar metals and alloys wherein incidence of higher porosity and/or cracks occur.

My invention is directed towards those aims.

SUMMARY OF INVENTION

It is therefore, the principal object of my invention to develop a process which may be used used with a fusion welding procedure using GMAW (Gas Metal Arc Welding), GTAW (gas Tungsten Arc Welding) or such other welding process to eliminate or reduce the incidence of internal and external cracks and porosity in welds.

Another object of my invention is to develop a process which will reduce the need of Non Destructive Testing (NDT), such as Dye Penetrant Testing or radiography; and therefore reduce the costs involved in NDT;

Another object of my invention is to develop a process which will reduce costs involved in re-work in the manufacturing operations.

A still further object of my invention is to provide a process which will produce sound welds in Aluminum structure, thus avoiding potential danger of destruction of the structure in which weld joint/s are involved.

I have found that these and other objects may be achieved by a process in which back-up material used has higher conductivity than the base metal/s.

Most particularly, these and other objects may be attained by use of back-up material of suitable heat-sink capacity, having width the same as that of the weld; thus, restricting the heat transfer to the base metal/s from weld. In this arrangement, heat transfer to the back-up material is much faster because of higher heat conductivity of the back-up material.

More particularly, these objects may be attained by use of a hollow tube of material having heat conductivity higher than the base metal/s through which flow of heat regulated fluid, regulates the rate of heat transfer from the weld; and hence the cooling rates in solidifying weld.

Further objects and features of my invention will be apparent from the following specifications and claims when considered in connection with drawings which include several embodiments of my invention.

BRIEF DESCRIPTION OF THE DRAWINGS.

A brief experiment was conducted on thin section 0.063 inch thick of Aluminum alloy 6061 making welds using aluminum alloy 4043 as filler metal. With a set of parameters chosen fillet welds were using Gas Tungsten Arc Welding process.

FIG. 3 is a Table showing hardness readings in both cases described above. Hardness readings were taken 3/16 inch away from the weld on Rockwell "E" scale. With trough as back-up hardenss near weld is much lower than the hardness when copper back-up is used in the manner shown in FIG. 2. Obviously, copper back-up in schematic FIG. 2, brought about higher rate of cooling than in the cooling rate in schematic FIG. 1.

FIG. 4B shows very low porosity, as compared with FIG. 4A. And the grain size in micrograph FIG. 4B is much finer than the grain size in FIG. 4A.

Figure 1:
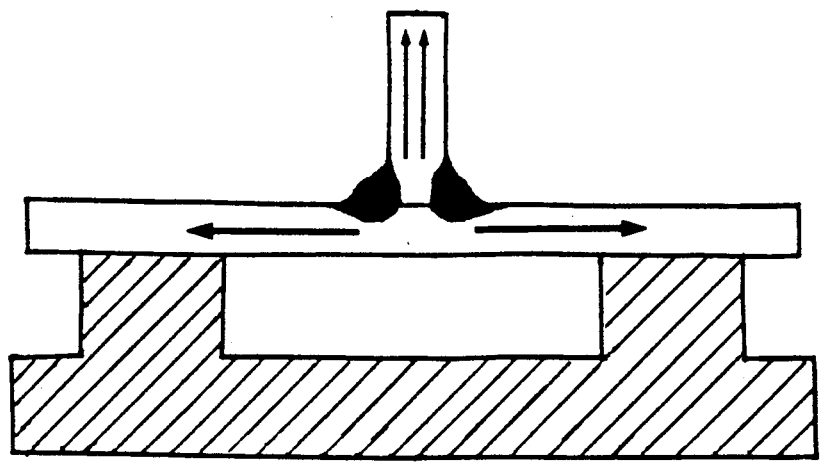
FIG. 1 is a schematic of the fillet weld with no back up directly under the weld joint. Only trough was used as shown in the figure. This arrangement permitted conduction of heat from the weld to the surrounding base metal. Thus, cooling gradients are imposed on the solidifying weld metal in two directions at right angles to each other, as shown by arrows in the figure. As heat transfers to adjoining base metal, cooling rates on the weld molten metal are generated. Two directions of the cooling gradients, generate effective orientations of the growing crystals from two mutually perpendicular base metal faces.
Figure 2:
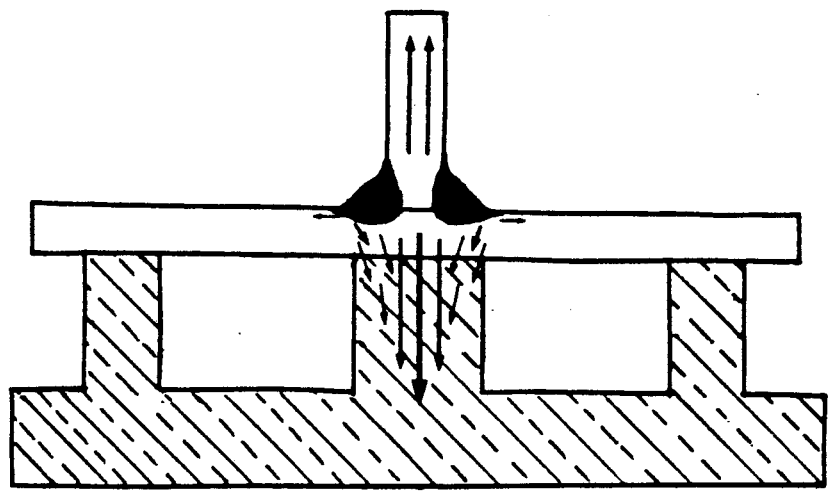
FIG. 2 is a schematic of another weld made using the same welding parameters and the same, namely, Gas Tungsten Arc Welding process; on similar base plates. In this figure copper back-up is used. Copper has about twice the heat conductivity of Aluminum alloy 6061. Also, the width of the back-up material is the same as that of the weld. Because of the higher heat conductivity of copper, higher cooling gradients come into effect on the solidifying weld metal. Arrows in the figure indicate the directions of heat flow. Heat transfer is much faster in the copper back-up. Therefore cooling gradients are mainly in the vertical direction into the copper back-up.
Figure 4A:
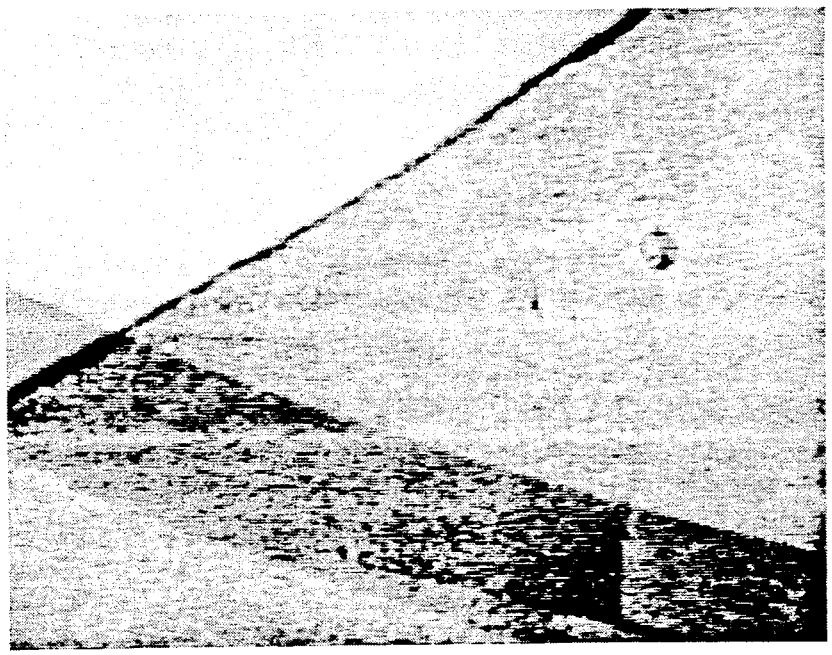
FIG. 4A shows the micrograph of weld corresponding to FIG. 2. There are no internal micro-cracks or voids.
Figure 4B:
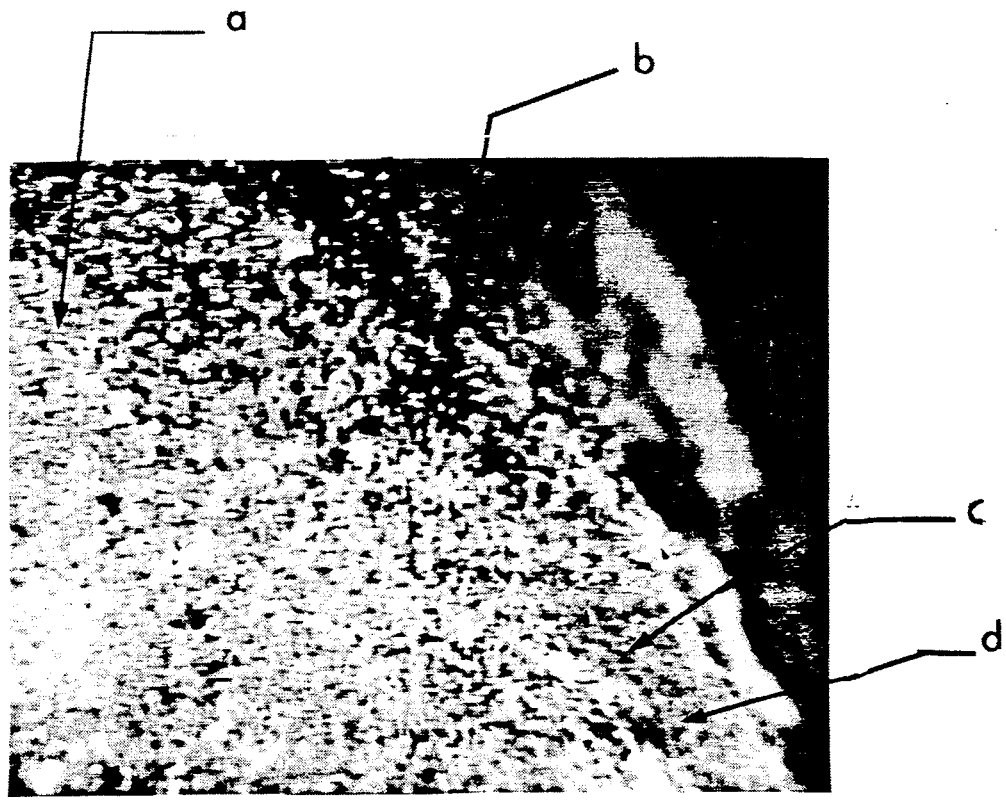
FIG. 4B shows micrograph of weld corresponding to FIG. 1. In this micrograph, "b" and "d" are cracks opening at surface of the weld. "a" is an internal micro-crack; and "c" is an internal micro-void joining the crack opening at surface of the weld.

Both the micrographs were taken at about ×30 magnification.

It is to be understood that while detailed drawings and specific examples given describe the preferred embodiments of my invention, they are for illustrations only. And the process invented is not limited to precise details and conditions disclosed; and various changes can be made within the ambit and scope of my invention. It is to be understood that the experimental details described are for proving the process invented; and in practical application, application of cooling rates higher than those that will be generate in the base metal/s, in a particular direction, is essential and other details such as welding process itself, or the filler metal or absence of filler metal or the specific back-up material, are unimportant.

My invention is defined by the following claims:

I claim:

1. A process for reducing the incidence of cracks and porosity generated during welding operation of metals-/alloys—more specifically welds of aluminum or aluminum alloy parts comprising the steps of:
   (a) providing stationary back-up support of material having higher conductivity than the base metal/s/ alloys.
   (b) the same back-up support material contacting the weld seam in immediate contact and being free from contact with the said surface of base metals-/alloys extending to either lateral side of the weld seam thereby providing an isolated transfer path for the heat;
   (c) the back-up material having substantial heat-sink capacity;
   (d) fusion welding the metal parts with minimal heat flow laterally of the weld seam due to use of the said back-up support.

2. The process as claimed in above claim, wherein said back-up support includes a hollow passage, and including the step of flowing the heat transfer fluid through said passage to regulate the rate of heat transfer from the molten metal during welding.

* * * * *

UNITED STATES PATENT AND TRADEMARK OFFICE
CERTIFICATE OF CORRECTION

PATENT NO. : 5,024,371

DATED : June 18, 1991

INVENTOR(S) : Madhav A. Unde

It is certified that error appears in the above-identified patent and that said Letters Patent is hereby corrected as shown below:

Column 3, line 11, change "4B" to----"4A"-----.

Column 3, line 12, change "4A" to ----"4B"----.

Column 3, line 12, change "4B" to ----"4A"----.

Column 3, line 13, change "4A" to ----"4B"----.

Signed and Sealed this

Thirteenth Day of April, 1993

Attest:

STEPHEN G. KUNIN

*Attesting Officer*      *Acting Commissioner of Patents and Trademarks*